(12) United States Patent
Bartels et al.

(10) Patent No.: US 8,452,503 B2
(45) Date of Patent: May 28, 2013

(54) GEAR CONTROL DEVICE AND METHOD FOR A GEAR CONTROL DEVICE

(75) Inventors: Ulrich Bartels, Stuttgart (DE); Manfred Guggolz, Leonberg (DE); Werner Hillenbrand, Neuffen (DE); Dieter Scheurer, Crailsheim (DE); Carsten Schewe, Korb (DE); David Ulmer, Filderstadt (DE)

(73) Assignee: Daimler AG, Stuttgart (DE)

( * ) Notice: Subject to any disclaimer, the term of this patent is extended or adjusted under 35 U.S.C. 154(b) by 270 days.

(21) Appl. No.: 12/992,061

(22) PCT Filed: Sep. 4, 2009

(86) PCT No.: PCT/EP2009/006434
§ 371 (c)(1),
(2), (4) Date: Jan. 5, 2011

(87) PCT Pub. No.: WO2010/034400
PCT Pub. Date: Apr. 1, 2010

(65) Prior Publication Data
US 2011/0166759 A1   Jul. 7, 2011

(30) Foreign Application Priority Data
Sep. 26, 2008 (DE) .......................... 10 2008 049 115

(51) Int. Cl.
*G06F 7/00* (2006.01)
(52) U.S. Cl.
USPC ............................... 701/67; 477/57; 477/130

(58) Field of Classification Search
USPC .......... 701/67; 477/143, 57, 130; 192/213.22, 192/204; 464/68.41, 64.1, 68.6
See application file for complete search history.

(56) References Cited

U.S. PATENT DOCUMENTS

| 7,377,374 | B2 * | 5/2008 | Buchhold ..................... 192/3.55 |
| 7,827,876 | B2 * | 11/2010 | Guggolz et al. ................. 74/335 |
| 2004/0118652 | A1 | 6/2004 | Muetzel et al. |
| 2005/0061599 | A1 | 3/2005 | Budal et al. |
| 2008/0109143 | A1 | 5/2008 | Bartels et al. |
| 2010/0044183 | A1 | 2/2010 | Guggolz et al. |

FOREIGN PATENT DOCUMENTS

| DE | 103 08 690 A1 | 10/2003 |
| DE | 10 2005 012 308 A1 | 9/2006 |
| WO | WO 2007/137680 A1 | 12/2007 |

OTHER PUBLICATIONS

International Search Report with partial translation dated Nov. 11, 2009 (Four (4) pages).
PCT/ISA/237 (Eight (8) pages).

\* cited by examiner

*Primary Examiner* — Thomas Black
*Assistant Examiner* — Luke Huynh
(74) *Attorney, Agent, or Firm* — Crowell & Moring LLP

(57) ABSTRACT

In a transmission control device with a control unit, to eliminate a tooth-on-tooth position in a transmission shifting unit, a transmission clutch is adjusted to a nominal clutch value. In at least one operating mode, the control unit is designed to specify a prescribed clutch value, which is independent of any intermediate clutch value setting.

12 Claims, 2 Drawing Sheets

GEAR CONTROL DEVICE AND METHOD FOR A GEAR CONTROL DEVICE

BACKGROUND AND SUMMARY OF THE INVENTION

This invention relates to a control device for a transmission.

Transmission control devices having control units provided in order to eliminate tooth-on-tooth transmission shifting unit positions by adjusting transmission clutches to nominal clutch values are already known.

The purpose of the present invention is to make it more comfortable when eliminating a tooth-on-tooth position. According to the invention, this objective is achieved by the characteristics claimed. Other design features will also be apparent.

The invention starts from a transmission control device having a control unit which is designed in order to eliminate a tooth-on-tooth position of a transmission shifting unit by adjusting a transmission clutch to a nominal clutch value.

It is proposed that, in at least one operating mode, the control unit is designed in order to specify a prescribed clutch value which is independent of an intermediate clutch value setting. By specifying a nominal clutch value, which is independent of the intermediate clutch value setting, a reaction of the transmission clutch to the specification of the nominal clutch value can be better reproduced, so that the control can be better adapted to the transmission clutch. If the control unit is well adapted, the transmission clutch can be controlled more precisely, in particular during a subsequent process to eliminate a tooth-on-tooth position, and comfort is increased as a whole during the elimination of the tooth-on-tooth position.

The term "designed" here is understood to mean specially programmed, equipped and/or planned. The term "nominal clutch value" is understood to mean a clutch value for the transmission clutch which is actually to be set for the transmission clutch. "Prescribed clutch value" is understood to mean a clutch value to be set by the control unit for the transmission clutch, but which is only actually set as the clutch value after a reaction time of the transmission clutch.

The term "clutch value" or the parameters associated therewith is understood to mean a clutch position and/or a clutch torque. Advantageously, in the control unit, a characteristic curve, which relates the clutch position and the clutch torque to one another, is stored. Thus, instead of a clutch position, a clutch torque can also be used, which, by virtue of the characteristic curve, can be converted to a clutch position.

Furthermore, the term "intermediate clutch value setting" is understood to mean a setting by way of which the actual clutch value can be adjusted to a defined intermediate clutch value. Preferably, the intermediate clutch value setting is in the form of a clutch position setting, and is provided in order to set a clutch position, for a defined time interval greater than zero, as accurately as possible to an intermediate clutch position.

The term "intermediate clutch position" is understood to mean a clutch position between a clutch-closed and a clutch-open position, such that the clutch-closed and clutch-open positions are explicitly excluded. A "clutch-open position" is understood to mean a clutch position in which the transmission is fully open. A "clutch-closed position" is understood to mean a clutch position in which the transmission clutch is fully closed. Analogously, as an intermediate clutch value, instead of the intermediate clutch position, an intermediate clutch torque can also be adopted.

It is also proposed to have the control unit designed to specify a prescribed clutch value that is different from the nominal clutch value. In this way, it is simple to find a prescribed clutch value that is different from the intermediate clutch value setting.

In addition, it is proposed to have the control unit designed to specify, as the prescribed clutch value, a clutch-closed position. The clutch-closed position can be set particularly simply independently of the intermediate clutch value setting, and the clutch-closed position is therefore particularly advantageous as the prescribed clutch value.

Advantageously, the control unit is designed to specify only a clutch-closed position and/or a clutch-open position as the prescribed clutch value. This makes it possible, at least in one operating mode, to completely do without the intermediate clutch value setting for eliminating the tooth-on-tooth position.

In a further embodiment it is proposed to design the control unit so that it determines an actuation duration. By virtue of the actuation duration, the intermediate clutch value can be set simply and independently of the intermediate clutch value setting, whereby the tooth-on-tooth position can be eliminated comfortably. Here, "actuation duration" is understood to mean a time interval during which a prescribed clutch value is set, which is different from the clutch-open position.

Advantageously, the control unit is designed to determine the actuation duration as a function of at least one clutch reaction parameter. This enables a particularly advantageous actuation duration to be chosen. Here, "clutch reaction parameter" should be understood to mean a parameter that describes a reaction of the transmission clutch to a specification of a prescribed clutch value, such as a reaction time and/or a displacement speed of the transmission clutch.

It is further proposed that the control unit is designed to define a clutch position in advance. In this way the transmission clutch can set the nominal clutch value accurately, so that the comfort is increased still more. "Define" is here understood to mean calculate or determine.

Preferably, the control unit is designed to define the clutch position in advance as a function of at least one clutch reaction parameter. This enables the clutch position to be defined particularly accurately. Here, "clutch position" should be understood to mean a clutch position actually to be expected. In this context "clutch reaction parameter" should be understood to mean a parameter which describes a reaction of the clutch when a prescribed clutch value of the clutch is changed.

As a further design feature it is proposed to have the control unit comprise an adaptation function designed to adapt at least one clutch reaction parameter individually to the transmission clutch, so that, for example, clutch wear can advantageously be taken into account.

It is particularly advantageous for the adaptation function to be designed for a clutch reaction parameter in the form of a clutch overshoot value. This enables an advantageously accurate determination of the clutch position to take place.

Furthermore, it is advantageous if the adaptation function is designed for a clutch reaction parameter in the form of a clutch reversal time. This enables the determination of the clutch position to be improved still further, so that the tooth-on-tooth position can be eliminated particularly comfortably.

In a particularly advantageous design it is proposed that in at least one further operating mode, the control unit is designed to set the nominal clutch value as the prescribed clutch value. In this way the nominal clutch value can be set accurately over an entire range, whereby in particular a clutch position or clutch torque can also be set, in which the transmission clutch is only slightly closed.

In that case, the control unit is advantageously designed to select the operating mode as a function of the nominal clutch value. This enables the operating mode to be selected simply.

Other advantages will be apparent from the description of the drawings given below. The drawings show an exemplary embodiment of the invention. The drawings, the description and the claims contain numerous characteristics in combination. Those with knowledge of the field will also be able to consider the said characteristics individually as appropriate, and to take them together in other rational combinations.

DETAILED DESCRIPTION OF THE INVENTION

Figure 1:
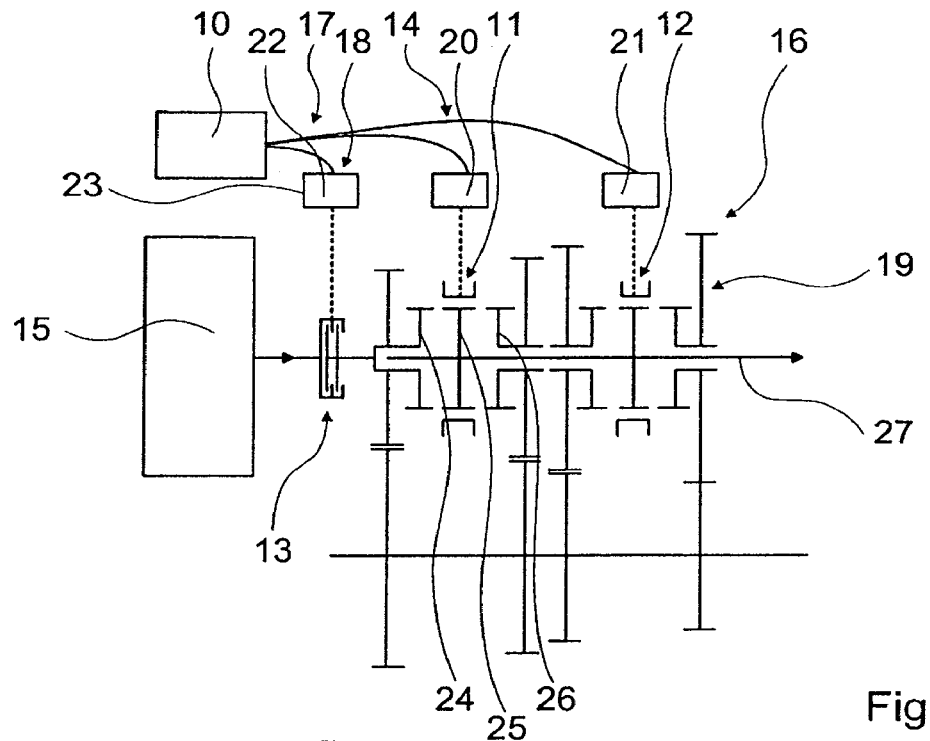
FIG. 1 is a schematic representation of a motor vehicle drivetrain.
Figure 2:
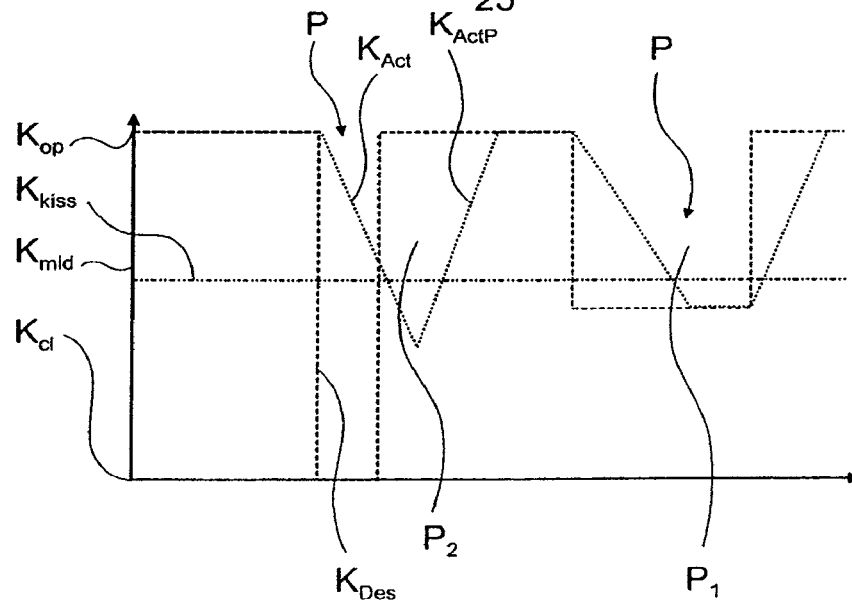
FIG. 2 is a diagrammatic representation of torque pulses produced by the transmission control device to eliminate a tooth-on-tooth position.
Figure 3:
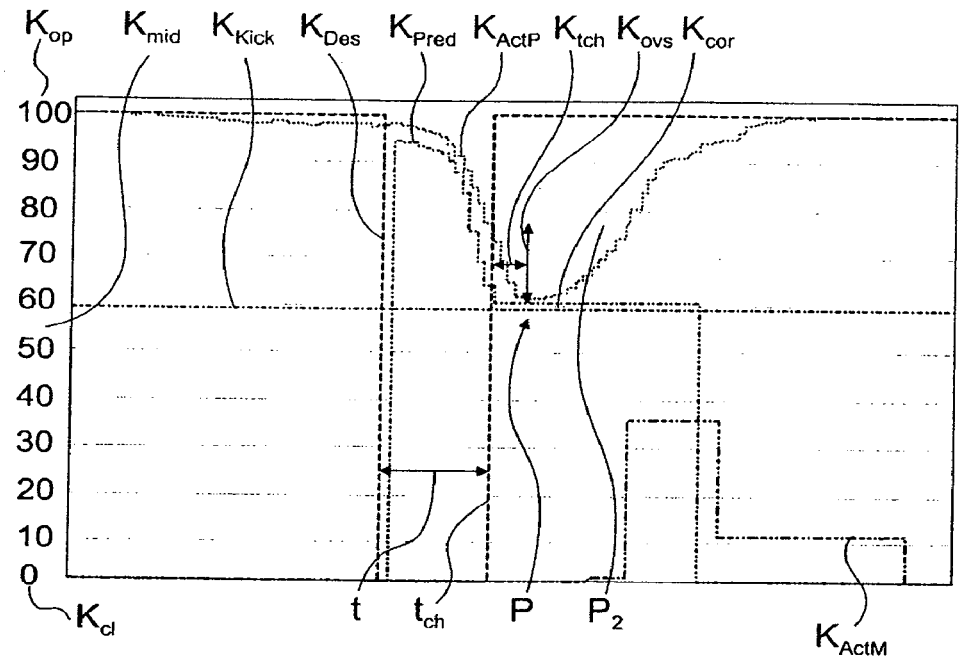
FIG. 3 illustrates a torque pulse produced by a prescribed clutch value set independently of an intermediate clutch value setting.
Figure 4:
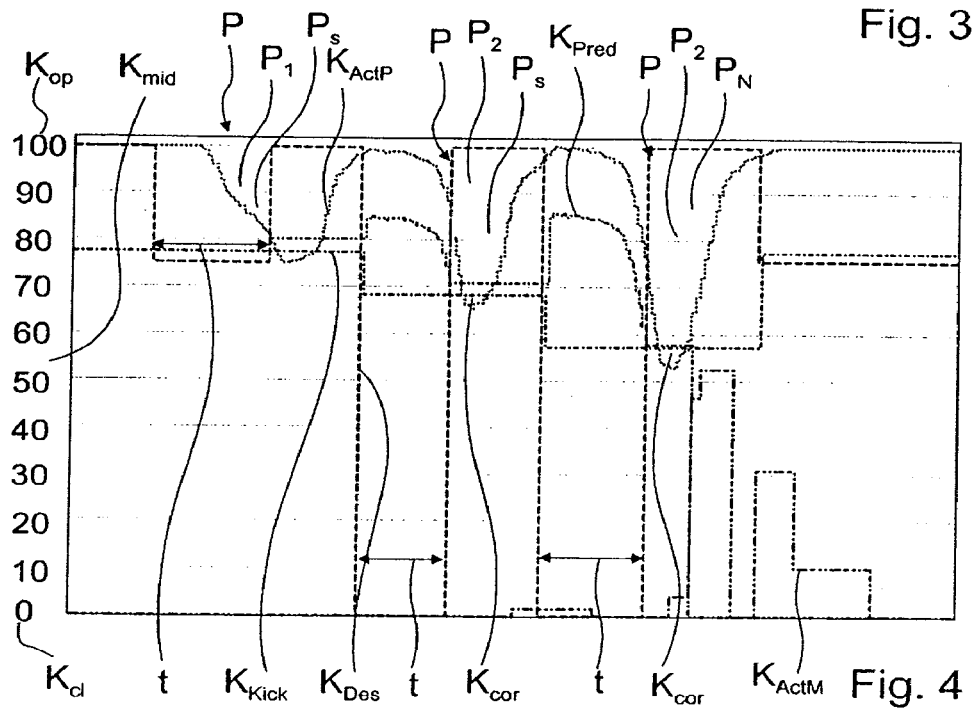
FIG. 4 illustrates various torque pulses that can be produced by the transmission control device.

FIG. 1 is a schematic representation of an example of a motor vehicle drivetrain with a motor vehicle transmission mechanism 14 and a drive machine 15. The motor vehicle transmission mechanism 14 comprises a transmission device 16, a transmission clutch device 17, and a transmission control device 18. The transmission device 16 comprises a transmission unit 19 with a plurality of transmission shifting units 11, 12 and transmission actuators 20, 21, by way of which the transmission shifting units 11, 12 can be operated. The transmission clutch device 17 comprises a transmission clutch 13 and a clutch actuator 22, by way of which the transmission clutch 13 can be actuated. The transmission control device 18 comprises a control unit 10, by way of which the transmission actuators 20, 21 and the clutch actuator 22 are controlled.

In addition, the transmission control device 18 comprises a sensor unit 23, by way of which a current, actually set clutch position $K_{AcP}$ of the clutch 13 can be determined. The clutch position $K_{ACtP}$ is defined as 0% for a fully closed, and as 100% for a fully open, transmission clutch 13. By way of the control unit 10 and an intermediate clutch value setting, the clutch position $K_{ACtP}$ can be adjusted to any desired intermediate clutch value $K_{mid}$ between a clutch-open position $K_{op}$, in which the transmission clutch 13 is fully open, i.e. 100% open, and a clutch-closed position $K_{cl}$, in which the transmission clutch 13 is fully closed, i.e. 0% open.

The clutch position $K_{ACtP}$ corresponds to a clutch torque $K_{ACtM}$ which is transmitted as a function of the clutch position $K_{ACtP}$ set. A characteristic curve, which relates the clutch torque $K_{ACtM}$ and the clutch position $K_{ACtP}$, is stored in the control unit 10. The control unit 10 can adapt the stored characteristic curve to an actual characteristic curve if the stored and the actual characteristic curves differ from one another. A clutch value $K_{ACt}$ specified or set by the control unit 10 can form the clutch position $K_{ACtP}$ or the clutch torque $K_{ACtM}$. Basically, in the description given below, instead of the clutch position $K_{ACtP}$ or magnitudes linked to it, the clutch torque $K_{ACtM}$ or magnitudes linked to it can be used, and the characteristic curve for converting the clutch position $K_{ACtP}$ can then in principle also be stored in another control unit.

The transmission shifting unit 11 is designed to form a rotationally fixed connection in the transmission unit 19. It comprises two shift elements 24, 25 designed to interlock positively with one another. The shift elements 24, 25 have matchingly configured shifting claws which can engage in one another to form the positive connection. During a shift operation of the transmission shifting unit 11, an operating situation can occur in which a tooth-on-tooth position exists within the transmission shifting unit 11. In a tooth-on-tooth position, the shifting claws of the transmission shifting unit 11 designed for interlocking engagement with one another are positioned one on top of the other, preventing the interlocking engagement of the shifting claws with one another. Such a tooth-on-tooth position is ascertained by detecting or monitoring a movement of the transmission actuator 20 associated with the transmission shifting unit 11.

To form a further connection, the transmission shifting unit 11 comprises a third shift element 26. The two shift elements 24, 26 of the transmission shifting unit 11 on the drive input side are designed analogously. The shift element 25 on the drive output side is provided for the two shift elements 24, 26 on the drive input side. The further transmission shifting unit 12 is designed analogously to the transmission shifting unit 11. For simplicity, the figure description is restricted to a function relating to the shift elements 24, 25 of the transmission shifting unit 11. A description relating to the shift element 26 or in relation to the transmission shifting unit 12 would be analogous, so concerning this, reference should be made to the description relating to the transmission shifting unit 11 and the shift elements 24, 25. The transmission unit 19 can also comprise some other number of shifting units.

The shift element 24 of the transmission shifting unit 11 on the drive input side is in active connection with the transmission clutch 13. By way of the clutch it can be connected to the drive machine 15. A rotation speed of the drive-side shift element 24 can be produced by the drive machine 15. The shift element 25 of the transmission shifting unit 11 on its drive output side is in active connection with a transmission output shaft 27. Its rotation speed is defined by a speed of the transmission output shaft 27. The rotation speed of the transmission output shaft 27 is defined by a vehicle speed. It is larger than zero when the motor vehicle is moving.

For greater shifting comfort during a shift process, for example while a shifting sleeve of the transmission shifting unit 11 is moved from a neutral position to a shift position, the transmission clutch 13 is opened. This enables the two shift elements 24, 25 of the transmission shifting unit 11 to adopt the same rotation speed, and the shifting claws can then engage in one another with interlock. However, a tooth-on-tooth position can also occur during the shift process.

To release or eliminate the tooth-on-tooth position, the transmission clutch 13 is briefly closed or operated with slip, so that the drive input side shift element 24 of the transmission shifting unit 11 is subjected to a torque pulse P which can lead to a rotation of the shift elements 24, 25 relative to one another. Provided that the size of this torque pulse P is large enough, the shift elements 24, 25 are rotated relative to one another out of the tooth-on-tooth position, the tooth-on-tooth position is eliminated, and, by way of the transmission actuator 20, the transmission shifting unit 11 can then be shifted to its engaged position. If the torque pulse P is too low, the torque pulse P results in an elimination of play within the transmission unit 19, but the tooth-on-tooth position remains as it is.

To eliminate the tooth-on-tooth position, the control unit 10 has a first operating mode and a second operating mode. In both operating modes a nominal clutch value $K_{Kick}$ is set for the transmission clutch 13, which is in the form of an intermediate clutch value $K_{mid}$ between a clutch-open position $K_{op}$ and a clutch-closed position $K_{cl}$. In both operating modes, the transmission clutch 13 is partially closed for a short time, i.e. operated with slip, and then opened again. Basically, however, it can then also be closed completely.

In the first operating mode, the control unit 10 delivers blunt-profiled torque pulses $P_1$. In this operating mode, the control unit 10 specifies as the prescribed clutch value the nominal clutch value $K_{Kick}$ in the form of an intermediate clutch value $K_{mid}$. The nominal clutch value $K_{Kick}$ or prescribed clutch value $K_{Des}$ depends on the size of the torque pulse $P_1$ to be produced. By virtue of the intermediate clutch value setting, the clutch position $K_{ACtP}$ is set as accurately and quickly as possible to the nominal clutch value $K_{Kick}$ formed as an intermediate clutch position $K_{mid}$. The prescribed clutch value $K_{Des}$ is in this case chosen such that, by virtue of the resulting torque pulse $P_1$, the tooth-on-tooth position is just released. An actuation duration t, during which the nominal clutch value $K_{Kick}$ is set as the prescribed clutch value $K_{Des}$, is stored in the control unit 10. This duration, for example, may amount to 200 ms, although other actuation duration values t as well can be defined by the control unit 10.

In the second operating mode, the control unit 10 delivers sharp-profiled torque pulses $P_2$. In this operating mode the control unit 10 first specifies the clutch-closed position $K_{cl}$ as the prescribed clutch value $K_{Des}$. After an actuation duration t that depends on the nominal clutch value $K_{Kick}$ is set, the control unit 10 again specifies the clutch-open position $K_{op}$ as the prescribed clutch value $K_{Des}$. The nominal clutch value $K_{Kick}$, to which the clutch position $K_{ACtP}$ is set, is set by virtue of the actuation duration t for which the clutch-closed value $K_{cl}$ is specified as the prescribed clutch value $K_{Des}$. In this second operating mode, only the clutch-closed position $K_{cl}$ or the clutch-open position $K_{op}$ is specified as the prescribed clutch value $K_{Des}$.

The prescribed clutch value $K_{Des}$, specified in the second operating mode, is independent of the intermediate clutch value setting since the clutch-open position $K_{op}$ and the clutch-closed position $K_{cl}$ can be set independently of any intermediate clutch value setting. The clutch-open position $K_{op}$, in which the transmission clutch is 100% open, is set by operating the clutch actuator 22 to its maximum extent in the direction of the clutch-open position $K_{op}$. The clutch-closed position $K_{cl}$, in which the transmission clutch 13 is 0% open, is set by operating the clutch actuator 22 to its maximum extent in the direction of the clutch-closed position $K_{cl}$.

The clutch actuator 22 is designed as a hydraulic displacement actuator. To move the clutch position $K_{ACtP}$ valves are opened, which are associated with the appropriate displacement direction. For the intermediate clutch value setting in which a precise adjustment of intermediate clutch values $K_{mid}$ is required, the appropriate valves for setting the prescribed clutch value $K_{Des}$ as a function of the current clutch value $K_{Act}$ are opened or closed. To produce a maximum direction displacement as is done in the second operating mode, the valves appropriate for the displacement direction concerned are opened to their full extent regardless of the current clutch value $K_{Act}$, so that the transmission clutch 13 is closed or opened at its maximum displacement rate.

To eliminate a tooth-on-tooth position in the second operating mode, the control unit 10 first specifies the clutch-closed position $K_{cl}$ as the prescribed clutch value $K_{Des}$ so that the transmission clutch 13 is fully energized and is closed at its maximum displacement rate. During the closing of the transmission clutch 13 the current clutch position $K_{ActP}$ is determined by the sensor unit 23. Starting from the current clutch position $K_{ActP}$ and various clutch reaction parameters, the control unit 10 calculates in advance a course $K_{Pred}$ of the clutch position $K_{ActP}$. As a function of the course $K_{Pred}$ of the clutch position $K_{ActP}$ determined in advance and of the nominal clutch value $K_{Kick}$ to be set, the control unit 10 determines the actuation duration t for which the clutch-closed position $K_{cl}$ remains set as the prescribed clutch value $K_{Des}$. As soon as this actuation duration t has lapsed or when the pre-calculated clutch position $K_{ActP}$ corresponds sufficiently accurately to the nominal clutch value $K_{Kick}$ to be set, the clutch-open position $K_{op}$ is once again set as the prescribed clutch value $K_{Des}$.

The clutch reaction parameters, as a function of which the further course $K_{Pred}$ of the clutch position $K_{ActP}$ is determined, are in the form of a clutch overshoot value $K_{ovs}$ and a clutch reversal time $K_{tch}$. Both clutch reaction parameters are parameters which describe the behavior of the transmission clutch 13 when the prescribed clutch value $K_{Des}$ specified is first the clutch-closed position $K_{cl}$ and then the clutch-open position $K_{op}$. The clutch reaction parameters are determined by the inertia of the clutch actuator 22 and of the transmission clutch 13. When the prescribed clutch value $K_{Des}$ changes from the clutch-closed position $K_{cl}$ to the clutch-open position $K_{op}$, the transmission clutch 13 first closes farther before its displacements direction changes and the transmission clutch 13 opens again.

The clutch overshoot value $K_{ovs}$ depends on the current clutch position $K_{ActP}$ at a change time $t_{ch}$ when the prescribed clutch value $K_{Des}$ is changed. The clutch overshoot value $K_{ovs}$ indicates how far the transmission clutch 13 still closes starting from the change time $t_{ch}$ after the clutch-open position $K_{op}$ has been specified. It is formed as a difference between the clutch position $K_{ActP}$ at the change time ten and a minimal clutch position $K_{Act}$ that can exist.

The clutch reversal time $K_{tch}$ also depends on the current clutch position $K_{ActP}$ at the change time $t_{ch}$. The clutch reversal time $K_{tch}$ indicates for how long, after the clutch-open position $K_{op}$ has been specified and starting from the change time $t_{ch}$, the transmission clutch 13 still tends toward the clutch-closed position $K_{cl}$, before its displacement direction changes again and it tends toward the clutch-open position $K_{op}$.

The clutch overshoot value $K_{ovs}$ and the clutch reversal time $K_{tch}$ are reproducible clutch reaction parameters. To determine these two clutch reaction parameters, the control unit 10 has an adaptation function by way of which the two clutch reaction parameters can be learned or adapted to actual values. The basis for both clutch reaction parameters is the change time ten when the prescribed clutch value $K_{Des}$ is changed from the clutch-closed position $K_{cl}$ to the clutch-open position $K_{op}$.

To adapt the two clutch reaction parameters, the transmission clutch 13 is first set to a clutch position $K_{ActP}$, which corresponds to the clutch-open position $K_{op}$. When the transmission clutch 13 is 100% open, the clutch-closed position $K_{cl}$ is specified as the prescribed clutch value $K_{Des}$ for a defined actuation duration t or up to a defined clutch position $K_{ActP}$. After the actuation duration t the clutch-open position $K_{op}$ is again specified as the prescribed clutch value $K_{Des}$. From a variation of the clutch position $K_{ActP}$ measured during this, the two clutch reaction parameters are determined. Since the clutch reaction parameters depend on the clutch position $K_{ActP}$, the clutch reaction parameters are determined for various actuation durations t which correspond to various clutch positions $K_{ActP}$ at the change time $t_{ch}$. The clutch reaction parameters determined for various actuation durations t or at various clutch positions $K_{ActP}$ then serve as support points for determining the course $K_{Pred}$ of the clutch position $K_{ActP}$ when eliminating a tooth-on-tooth position.

The nominal clutch value $K_{Kick}$ set for eliminating the tooth-on-tooth position comprises a correction parameter $K_{Cor}$, by means of which transmission and driving situation parameters are taken into account. A first part of the correction parameter $K_{Cor}$ depends on a transmission gear to be engaged, formed by way of the transmission shifting unit 11. By virtue of this first part, the nominal clutch value $K_{Kick}$ is increased in low transmission gears and reduced in high ones. A second part of the correction parameter $K_{Cor}$ takes account of an uphill or downhill road gradient. On an uphill gradient steeper than a first limit value, the nominal clutch value $K_{Kick}$ is increased, while on a downhill gradient steeper than a second limit value, the nominal clutch value $K_{Kick}$ is reduced. An amount by which the nominal clutch value $K_{Kick}$ is reduced on a downhill road gradient is twice as large as an amount by which it is increased on an uphill road gradient.

When eliminating a recognized tooth-on-tooth position, with reference to the nominal clutch value $K_{Kick}$ the choice is made whether, to release the tooth-on-tooth position, the first or the second operating mode should be selected. The operating mode is chosen having regard to the level of the nominal clutch value $K_{Kick}$. If the nominal clutch value $K_{Kick}$ corresponds to a clutch position $K_{ActP}$ beyond a defined value, for example 70%, the first operating mode is selected, and it is attempted by way of a blunt-profiled torque pulse $P_1$ to eliminate the tooth-on-tooth position. If the nominal clutch value $K_{Kick}$ corresponds to a clutch position $K_{ActP}$ below the defined value, the second operating mode is selected, and it is attempted to eliminate the tooth-on-tooth position by way of a sharp-profiled torque pulse $P_2$. Regardless of which operating mode is selected, after a torque pulse P, it is checked whether the torque pulse P has succeeded and the tooth-on-tooth position has disappeared.

If the torque pulse P has not been successful and the tooth-on-tooth position is still in place, the nominal clutch value $K_{Kick}$ is adapted. Then, by way of a further torque pulse P for which the adapted nominal clutch value $K_{Kick}$ has been set, a renewed attempt is made to release the tooth-on-tooth position. For this, having regard to the level of the nominal clutch value $K_{Kick}$ it is again decided whether to use the first or the second operating mode to eliminate the tooth-on-tooth position. Basically, between two successive torque pulses P a pause is allowed, during which the transmission clutch 13 adopts a clutch position $K_{ActP}$ again which enables reproducible torque pulses. A criterion for the length of this pause is, for example, to wait until the clutch position $K_{ActP}$ is again at least 98%. If the tooth-on-tooth position has successfully been released, then if the rotation of the shifting claws that results from the torque pulse P is outside a defined range the nominal clutch value $K_{Kick}$ is adapted.

As a function of various parameters under which the adaptation of the nominal clutch value $K_{Kick}$ takes place, the nominal clutch value $K_{Kick}$ is adapted by a predefined fixed amount or by an adapted correction amount. Parameters, as a function of which the predefined fixed value or the adapted correction value are selected, are, for example, the amount of shifting claw rotation, a number of torque pulses P already carried out successfully, and/or the actual clutch value $K_{Act}$ set in relation to the nominal clutch value $K_{Kick}$. The adapted correction value also depends on one or more parameters, such as a number of torque pulses P already carried out successfully, a rotation speed difference between the shift elements 24, 25, the actual clutch value $K_{Act}$ set in relation to the nominal clutch value $K_{Kick}$, the actual clutch value $K_{Act}$ set in relation to the nominal clutch value $K_{Kick}$ of a previous torque pulse P, and/or a termination parameter.

To prevent the setting of a nominal clutch value $K_{Kick}$ which is essentially too large, at defined time points, safety torque pulses $P_s$ are carried out by way of which the nominal clutch value $K_{Kick}$ is approximated to a contact point $K_{Kiss}$ of the transmission clutch 13. The safety torque pulses $P_s$ are only carried out in the motor vehicle once its ignition has been turned on. A number of safety torque pulses $P_s$ to be carried out is stored in the control unit 10. An adjustment of the safety torque pulses $P_s$ also takes place in one of the two operating modes, such that a choice of the operating mode depends on the level of the safety torque pulse $P_s$ to be carried out. For the safety torque pulse $P_s$, nominal clutch values $K_{Kick}$ are set, which are lower then a nominal clutch value $K_{Kick}$ last set, which has been stored in the control unit 10 from the last torque pulse P.

The nominal clutch value $K_{Kick}$ or values set for the safety torque pulses $P_s$ depend(s) on the number of safety torque pulses $P_s$ to be carried out and on the last-set nominal clutch value $K_{Kick}$. For each safety torque pulse $P_s$ to be carried out, a constant value is added to the last-known nominal clutch value $K_{Kick}$, in order to increase the nominal clutch value $K_{Kick}$ for the safety torque pulse $P_s$. For example, if the last-set nominal clutch value $K_{Kick}$ is 60% and two safety torque pulses $P_{s,\ 1}$, $P_{s,\ 2}$ are to be carried out with an interval of 9%, then, for the first safety torque pulse $P_{s,\ 1}$, a nominal clutch value $K_{Kick}$ of 78%, and for the second safety torque pulse $P_{s,\ 2}$, a nominal clutch value $K_{Kick}$ of 69% are set. In this case, for a first safety torque pulse $P_{s,\ 1}$ the first operating mode, i.e. a blunter-profiled torque pulse $P_1$ is chosen, while for a subsequent second safety torque pulse $P_{s,\ 2}$ and a third, normal torque pulse $P_N$, the second operating mode, i.e. a sharp-profiled torque pulse $P_2$, is chosen.

When delivering torque pulses P the control unit 10 carries out safety interrogations which, in defined circumstances, lead to a termination of the torque pulse P. For the safety torque pulses $P_s$, only part of the safety interrogations is taken into account. For the normal torque pulses $P_N$, all the safety interrogations are taken into account.

In a first safety interrogation applicable for both normal $P_N$ and safety torque pulses $P_s$, it is checked whether the speed of the drive machine 15 and the speed of the transmission output shaft 27 are both zero. If both these speeds are zero, i.e. if the drive machine 15 and the motor vehicle are both stationary, the torque pulses P are stopped or terminated.

In a second safety interrogation, applicable for the normal torque pulses $P_N$ and the safety torque pulses $P_s$, it is checked whether there has been a command to the clutch actuator 22 which overrides a control action by the control unit 10. If there is an overriding command, such as a return command by another control unit, the torque pulses P are stopped or terminated.

In a third safety interrogation a timeout for the torque pulse P is checked. A single torque pulse may last for no longer than a defined time. If this time is exceeded the torque pulse P is stopped or terminated. The third safety interrogation applies only to normal torque pulses $P_N$ but does not affect safety torque pulses $P_s$.

In a further safety interrogation a rotation speed increase of the drive input side shift element 24 connected to the transmission clutch 13, brought about by the torque pulse P, is checked. If the speed increase exceeds a defined limit value, for example 18 revolutions per minute, the torque pulse P is stopped or terminated. This safety interrogation applies only to normal torque pulses $P_N$ and does not affect safety torque pulses $P_s$.

In another safety interrogation a speed difference between the drive input side shift element 24 and the drive output side shift element 25 before a torque pulse P is checked. If the speed difference exceeds a defined limit value, for example 100 revolutions per minute, the torque pulse P is postponed until the speed difference has fallen below the defined limit value. This safety interrogation applies only to normal torque pulses $P_N$ and to safety torque pulses $P_s$ that come after the first safety torque pulse $P_s$. It does not affect the first safety torque pulse $P_s$.

During a learning process for the clutch reaction values as well, a safety interrogation is carried out by the control unit 10. During the learning process a rotation speed of the drive machine 15 is checked. If the speed is zero, the learning process is terminated.

The invention claimed is:

1. A transmission control device comprising:
   a transmission clutch,
   a clutch actuator, and
   a control unit that, to eliminate a tooth-on-tooth position in a transmission shifting unit, is designed to adjust the transmission clutch actuated by the clutch actuator to a nominal clutch value,
   wherein, in at least one operating mode, the control device is designed to operate the clutch actuator for an actuation duration as far as possible in a direction of a clutch-closed position, and, after the actuation duration lapses, to operate the clutch actuator as far as possible in a direction of a clutch-open position.

2. The transmission control device according to claim 1, wherein the control unit is designed to determine the actuation duration as a function of at least one clutch reaction parameter.

3. The transmission control device according to claim 1, wherein the control unit is designed to specify a prescribed clutch value, which is different from the nominal clutch value, and to specify as the prescribed clutch value only the clutch-closed position, the clutch-open position, or both the clutch-closed position and the clutch-open position.

4. The transmission control device according to claim 1, wherein the control unit is designed to determine a clutch position in advance.

5. The transmission control device according to claim 4, wherein the control unit is designed to determine the clutch position in advance as a function of at least one clutch reaction parameter.

6. The transmission control device according to claim 1, wherein the control unit provides an adaptation function designed to adapt at least one clutch reaction parameter to the transmission clutch.

7. The transmission control device according to claim 1, wherein the adaptation function is designed for a clutch reaction parameter in the form of a clutch overshoot value.

8. The transmission control device according to claim 6, wherein the adaptation function is designed for a clutch reaction parameter in the form of a clutch reversal time.

9. The transmission control device according to claim 1, wherein, in at least one further operating mode, the control unit is designed to set the nominal clutch value as the prescribed clutch value.

10. The transmission control device according to claim 1, wherein the control unit is designed to select the operating mode as a function of the nominal clutch value.

11. The transmission control device according to claim 7, wherein the adaptation function is designed for a clutch reaction parameter in the form of a clutch reversal time.

12. A method for operating a transmission control device with a control unit to eliminate a tooth-on-tooth position in a transmission shifting unit with adjustment of a transmission clutch actuated by a clutch actuator to a nominal clutch value in at least one operating mode, comprising:
   operating the clutch actuator for an actuation duration as far as possible in a direction of a clutch-closed position, and
   operating the clutch actuator as far as possible in a direction of a clutch-open position after the actuation duration has lapsed.

* * * * *